United States Patent [19]
Uda et al.

[11] Patent Number: 5,167,944
[45] Date of Patent: Dec. 1, 1992

[54] METHOD FOR THE PRODUCTION OF ALUMINUM NITRIDE-BASED SINTERED PRODUCTS

[75] Inventors: Masahiro Uda, Tokyo; Katsuhisa Ohsaki, Matsudo; Yoshikazu Morita, Funabashi, all of Japan

[73] Assignee: Nisshin Steel Co., Ltd., Japan

[21] Appl. No.: 773,646

[22] PCT Filed: Apr. 9, 1990

[86] PCT No.: PCT/JP90/00475
§ 371 Date: Oct. 17, 1991
§ 102(e) Date: Oct. 17, 1991

[87] PCT Pub. No.: WO90/12768
PCT Pub. Date: Nov. 1, 1990

[30] Foreign Application Priority Data
Apr. 18, 1989 [JP] Japan .................... 1-96296

[51] Int. Cl.⁵ .................................. C01B 21/072
[52] U.S. Cl. .............................. 423/412; 423/344; 501/96
[58] Field of Search ............... 501/96, 98; 423/125, 423/344, 353, 412; 264/65

[56] References Cited
U.S. PATENT DOCUMENTS
4,243,621  1/1981  Mori et al. ............................ 264/65
4,627,815  12/1986  Aldinger et al. ...................... 423/24

Primary Examiner—Mark L. Bell
Assistant Examiner—Chris Gallo
Attorney, Agent, or Firm—Lowe, Price, LeBlanc & Becker

[57] ABSTRACT

An aluminum nitride-based sintered product can be produced at a relatively low heating temperature by mixing at least 20% by weight of ultrafine aluminum powder having an average size of not exceeding 0.5 μm with other powdery raw material, compression molding the resultant powdery mixture, and heating the molded article under a nitrogen atmosphere at a heating temperature ranging from 600° to 800° C. to nitride the ultrafine aluminum powder, whereupon the heat of nitridation is utilized to sinter the molded article.

11 Claims, 3 Drawing Sheets

METHOD FOR THE PRODUCTION OF ALUMINUM NITRIDE-BASED SINTERED PRODUCTS

FIELD OF THE INVENTION

The present invention relates to a method for the production of an aluminum nitride based sintered product, in which the reaction heat of ultrafine aluminum powder with nitrogen gas is utilized, and thus the aluminum nitride-based sintered product can be produced at a relatively low heating temperature.

BACKGROUND OF THE INVENTION

An aluminum nitride sintered product has been conventionally produced by such a method wherein a mixture of aluminum nitride powder (having a size of 1 $\mu$m or more) with a sintering auxiliary is molded to a desired shape, and the molded article is heated in a non-oxidizing gas, such as nitrogen or argon, of an atmospheric pressure to a high temperature of the order of 1600° to 1850° C. to effect sintering.

As a special method, in J. Ceram. Assoc. Japan, 73 (2) 1965, pages 34-38, Shigetomo MATSUO et al. disclose production of an AlN sintered article by heating a molded mixed powder of AlN and Al in an nitrogen atmosphere. According to MATSUO et al., AlN powder of an average size of 5.67 $\mu$m is mixed with Al powder of an average size of 3.27 $\mu$m, the proportion of the Al powder being 20% by weight or less; and the mixed powder is molded under pressure and placed in a heating furnace, where nitrogen gas is caused to flow at a flow rate of 0.5 liter/minute to maintain a pressure of one atmosphere and the furnace temperature is raised at a heating rate of 300° C./hour to 1400° C. to produce an AlN sintered article. The Al powder reacts with the nitrogen gas to form AlN, and eventually a uniform AlN sintered article is produced. It is said that in an example wherein the mixed powder contained 20% by weight of Al powder, a heating temperature of at least 700° C. was necessary for all of the Al powder to react with the nitrogen gas. Examples wherein the mixed powder contained 15, 10, 5 and 0% by weight of Al powder, respectively, are also shown. Furthermore, effects of the sintering temperature (furnace temperature) on the density and flexual strength of the sintered product are graphically shown (FIGS. 1 and 2). It is said that the nitridation of Al powder slowly proceeds, irrespective of the tested mixing ratio of Al powder, when the sintering temperature is raised from about 500° C. to about 700° C., and this is substantiated by the results shown in FIGS. 1 and 2. In other words, it is not shown that the density or flexual strength of the sintered product shows any peak value at a certain sintering temperature.

PROBLEMS IN THE ART THE INVENTION AIMS TO SOLVE

When aluminum nitride powder is used as a raw material to be sintered, a molded powder of aluminum nitride should be externally heated to a temperature of about 1800° C., or otherwise the molded powder is not sintered. This is because aluminum nitride, when heated, is sublimated and decomposed at a temperature of 2450° C. without taking a liquid phase. Thus, the sintering force of aluminum nitride under atmospheric pressure is solely based on solid diffusion between particles, which requires an extremely prolonged period of time or a very high temperature. On that account, the conventional method for producing aluminum nitride sinter requires a high temperature furnace and the method steps in themselves are complicated.

In a case wherein a mixed powder of Al powder and AlN powder is used as a raw material to be sintered, as proposed by MATSUO et al., the Al powder existing in clearances between particles of the AlN powder is transformed to AlN, and eventually AlN is sintered, and therefore, in order to effect satisfactory sintering, external heating to a high temperature is necessary even after the completion of the nitridation of the Al powder. While the high temperature needed in this case may be somewhat lower than that used in the above-mentioned conventional method, a high temperature furnace capable of heating to a temperature of at least 1000° C. is required again.

An object of the invention is to provide an improved method for the production of an AlN-based sintered product using a low temperature furnace, in which the exothermic reaction between aluminum and nitrogen is efficiently utilized as a heat source for sintering, thereby producing an AlN-based sintered product of a good quality, including not only a sintered product of AlN but also a composite sintered product of AlN and other ceramic material, using a low furnace temperature.

SUMMARY OF THE INVENTION

According to the invention there is provided a method for the production of an aluminum nitride-based sintered product, which comprises mixing at least 20% by weight of ultrafine aluminum powder having an average size of not exceeding 0.5 $\mu$m with other powdery raw material, compression molding the resultant powdery mixture, placing the molded article in a heating furnace, and heating the article under a nitrogen atmosphere at a furnace temperature ranging from 600° to 800° C., thereby causing the article to generate heat to a temperature of at least 1000° C. Preferably, the furnace temperature at which the molded article is heated in the furnace is a temperature near the melting point (660° C.) of aluminum and which causes the molded article to emit light. The other powdery raw material may be one or more fine materials selected from aluminum nitride, metals other than aluminum, metal nitrides (other than aluminum nitride), metal oxides and metal carbides.

DETAILED DESCRIPTION OF THE INVENTION

Figure 1:
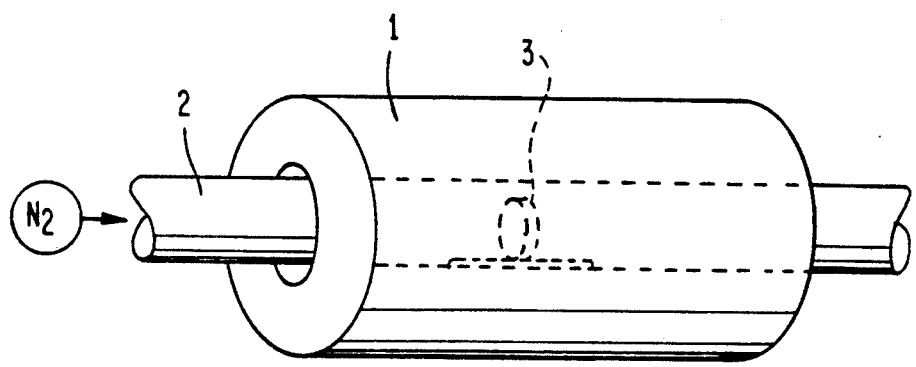
FIG. 1 is a schematic perspective view of a heating apparatus used in Examples described hereinafter.

We have found that when a molded mixed powder of ultrafine aluminum powder having an average size of not exceeding 0.5 μm with one or more other powdery raw materials such as fine metals other than aluminum and various fine ceramic materials is heated in a nitrogen atmosphere, if the proportion of the ultrafine aluminum powder in the mixed powder is 20% by weight or more, remarkable heat generation accompanied by light emission rapidly takes place at a heating temperature (furnace temperature) of from 500° to 900° C., in particular within the range of 550° and 700° C., especially near the melting point (660° C.) of aluminum, whereby the molded mixed powder can be effectively sintered at the above-mentioned low furnace temperatures. We have also found that the amount of heat generated during the nitridation can be adjusted by varying the apparent density of the molded mixed powder and the proportions of ultrafine aluminum powder and other powdery material.

The invention is based on the above-mentioned findings. One of the features of the method according to the invention resides in the utilization of heat internally generated by the nitridation of aluminum to instantaneously achieve a high temperature necessary to effect satisfactory sintering, instead of externally supplying substantially all heat necessary for sintering as is the case in the conventional method for producing an aluminum nitride sintered product. Another feature of the invention resides in the use of ultrafine aluminum powder to promote sintering. Thus, external heating to a furnace temperature as high as 1000° C. or higher in a heating furnace is not necessary in the method according to the invention. In order to utilize substantially all the heat of reaction between aluminum and nitrogen gas, thereby instantaneously achieving a high temperature of at least 1000° C., it is necessary to use ultrafine aluminum powder of a submicron size, that is ultrafine aluminum powder having an average size of 0.5 μm or less. Furthermore, such ultrafine aluminum powder should be used in a proportion of at least 20% by weight, preferably at least 25% by weight. The ultrafine aluminum powder which can be used herein is not restricted by a particular production method, so far as it has an average size of 0.5 μm or less. However, fine aluminum powder which is now commercially available has an average size of 1 μm or more. The ultrafine aluminum powder which can be used herein can be readily prepared by a method proposed by one of us in JP 1 146 170, that is JP A 59-57 904.

Aluminum nitride formed by the nitridation of the ultrafine aluminum constitutes a part of the sintered product. Accordingly, starting with the ultrafine aluminum powder incorporated with fine aluminum nitride powder, a sintered product of aluminum nitride can be produced. Furthermore, from the ultrafine aluminum powder incorporated with one or more fine powdery materials other than aluminum nitride, for example, metals other than aluminum, and ceramics such as metal nitrides, metal oxides and metal carbides, aluminum nitride based composite sintered products can be produced. While the proportion of the ultrafine aluminum powder should be appropriately adjusted depending upon the kind and amount of the other powdery raw material used, at least 20% by weight, and preferably at least 25% by weight, of the ultrafine aluminum powder is required. While the size of the other powdery material is not very critical, it is preferred the other powdery material has an average size of not in excess of 5 μm.

The ultrafine aluminum powder is mixed with one or more other powdery materials preferably uniformly, and the resultant mixed powder is compression molded into a desired shape. By appropriately adjusting the degree of the compression depending upon the kind and amount of the other powdery material, the rate of the nitridation of the ultrafine aluminum powder can be controlled. Sintering of the molded article is carried out in a heating furnace maintained under a nitrogen atmosphere. The heating condition used is such that it can cause the nitridation to rapidly proceed at a temperature near the melting point of aluminum. The progress of the nitridation can be confirmed by light emission. While the furnace temperature at which a peak of heat generation and light emission appears varies depending upon the manufacturing process and surface conditions of the ultrafine aluminum powder, and the intensity of light emission is affected by the rate of heating and the density of the molded mixed powder, a high temperature accompanied by light emission ensures satisfactory sintering.

EXAMPLE 1

70 Parts by weight of ultrafine aluminum powder having an average size of 0.1 to 0.2 μm was thoroughly mixed with 30 parts by weight of ultrafine aluminum nitride powder having an average size of 0.1 to 0.2 μm, and the resultant powdery mixture was compression molded under a pressure of 100 kg/cm$^2$. The molded article was placed in a heating furnace as shown in FIG. 1, and under a nitrogen atmosphere the furnace temperature was raised at a rate of 5° to 15° C./min. In FIG. 1, reference numeral 1 designates a heating furnace, 2 a reaction tube, and 3 a molded article, respectively. The temperature of the molded article and the furnace temperature were continuously monitored, and the article was visually observed. When the furnace temperature reached about 580° C., the molded article began to generate heat, and at a furnace temperature of from about 600° to 700° C., a distinct peak of light emission and heat generation was observed. Even though further heated, the light emission was observed no longer. More particularly, the molded article did not emit light before the furnace temperature reached 620° C.; the light emission abruptly began at a furnace temperature of about 620° C.; within a few seconds the luminance of the molded article reached the maximum; and thereafter the luminance of the molded article decreased in spite of further increase of the furnace temperature. The molded article which underwent heat generation and light emission was a satisfactorily sintered product, in spite of the fact that the furnace temperature was below 1000° C.

Figure 2:
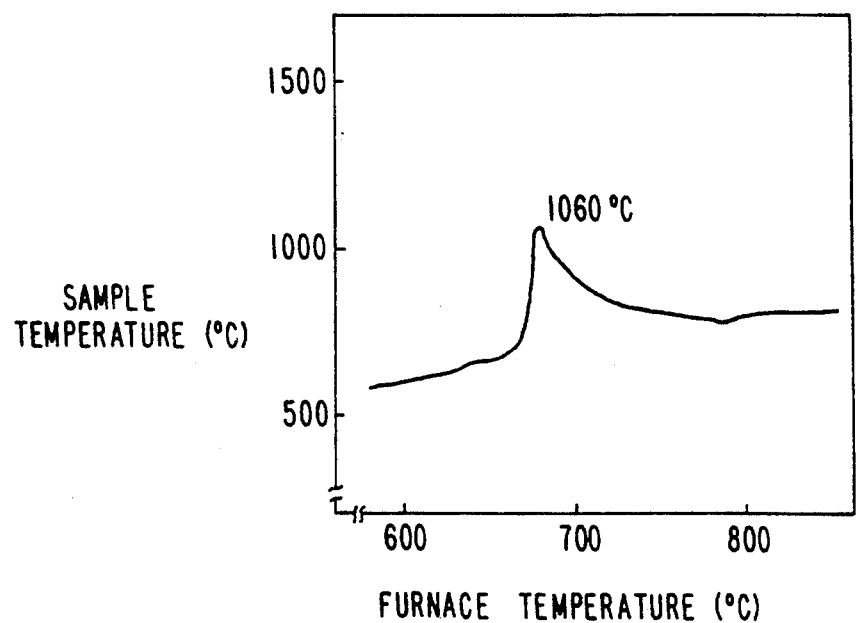
FIG. 2 is a graph of the sample temperature plotted against the furnace temperature when the compression molded sample is heated in the furnace as described in Example 1.
Figure 3:
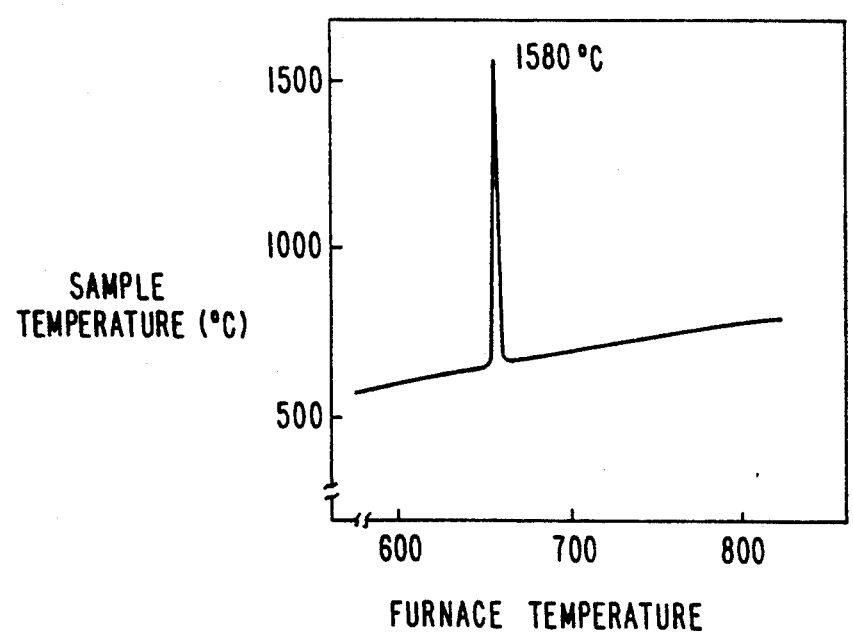
FIG. 3 is a graph of the sample temperature plotted against the furnace temperature when the mixed powder sample is similarly heated in the furnace.

FIG. 2 is a graph of the temperature of the molded article of this Example plotted against the furnace temperature when it was heated in the manner as described above. FIG. 3 is a graph of the sample temperature plotted against the furnace temperature when the mixed powder sample (instead of the molded article) was similarly heated in the furnace. In both cases, it is revealed that the sample abruptly generates heat at a furnace temperature of about 660° to 680° C. to a sample temperature of 1060° C. (in the case of the molded article) or to a sample temperature of 1580° C. (in the case of the mixed powder).

Figure 4:
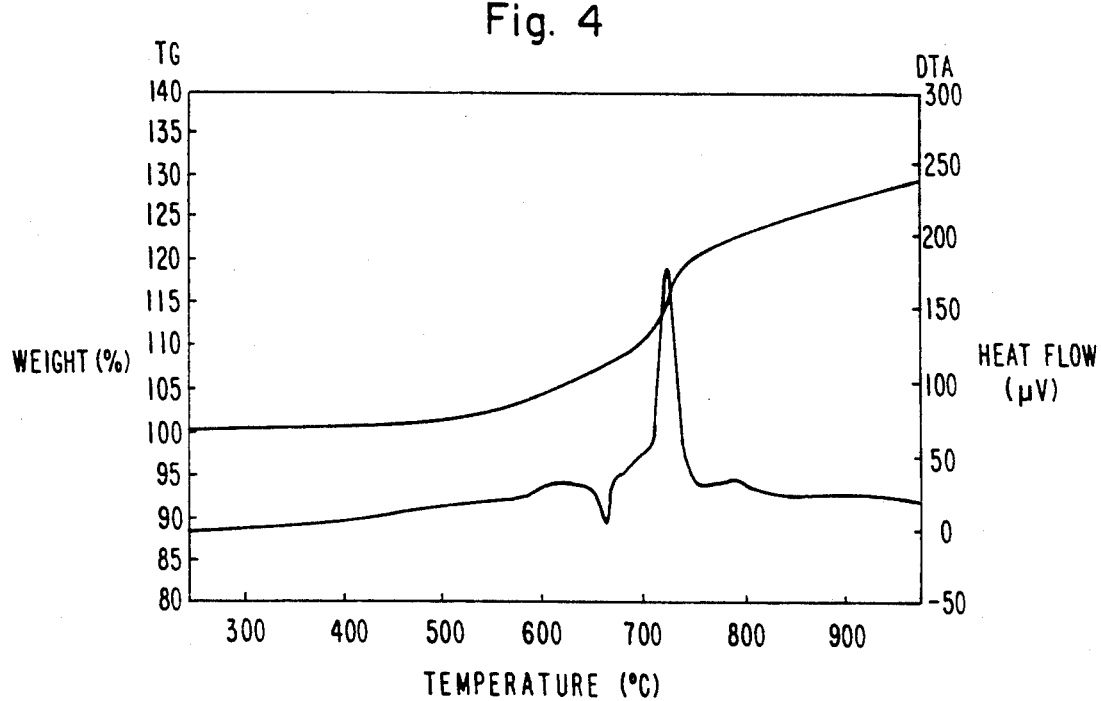
FIG. 4 shows the differential thermal analysis (DTA curve) and the thermogravimetric analysis (TG curve) on the mixed powder sample.

FIG. 4 shows the differential thermal analysis (DTA curve) and the thermogravimetric analysis (TG curve) on the mixed powder sample. From this figure a distinct peak of heat generation and a sudden increase in weight due to the nitridation are observed at a furnace temperature of 720° C.

Figure 5:
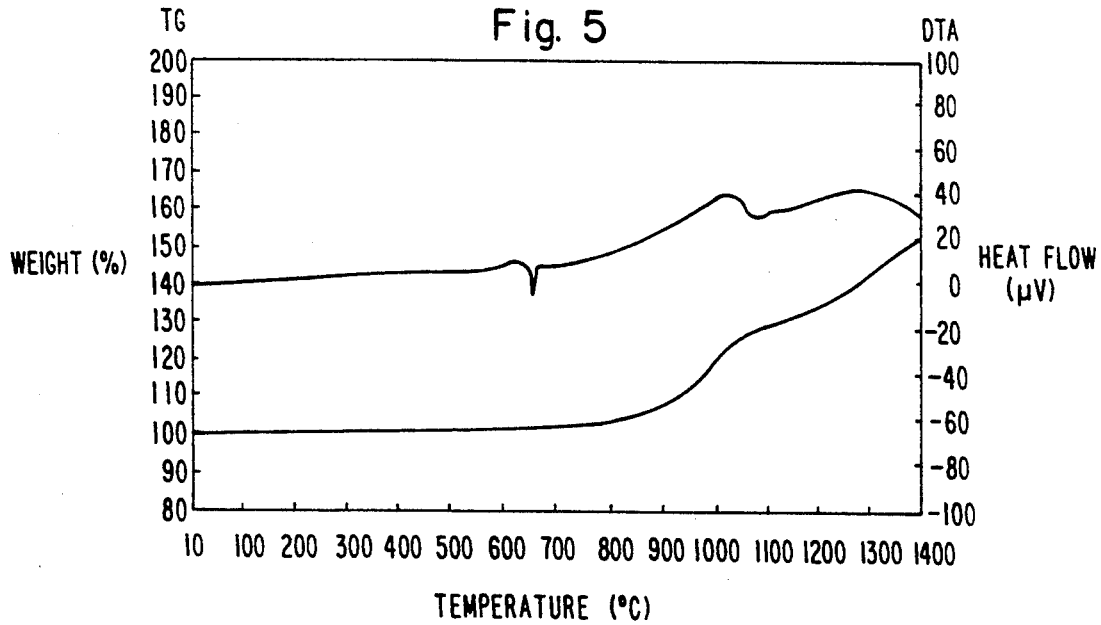
FIG. 5 shows the differential thermal analysis (DTA curve) and thermogravimetric analysis (TG curve) on a comparative powdery mixture of aluminum powder having an average size of 3 $\mu$m and aluminum nitride powder having an average size of 1.8 $\mu$m.

FIG. 5 shows the differential thermal analysis (DTA curve) and the thermogravimetric analysis (TG curve) on a comparative powdery mixture of commercially available aluminum powder having an average size of 3 μm and aluminum nitride powder having an average size of 1.8 μm, the proportions of the metal and nitride in the powdery mixture and the heating conditions being the same. In this case, increase in weight due to the nitridation of aluminum is not observed before the furnace temperature reaches the melting point (660° C.) of aluminum, begins to appear at a furnace temperature of about 800° C. and continues to appear until the furnace temperature reaches 1400° C. As to heat generation, a peak of heat absorption due to melting of aluminum appears at a furnace temperature of 660° C. which is the melting point of aluminum, and heat generation due to the nitridation of aluminum begins to appear at a furnace temperature of about 800° C. with a peak at a furnace temperature of about 1040° C. In this case a product obtained by heating at a furnace temperature of 1000° C. or lower had a very poor strength as revealed by the fact that it was collapsed when touched with a finger.

EXAMPLE 2

An exothermic mixed powder was prepared by thoroughly mixing 70 parts by weight of ultrafine aluminum powder having an average size of 0.2 μm with 30 parts by weight of ultrafine aluminum nitride powder having an average size of 0.3 μm. The resultant exothermic mixed powder was mixed with each of various powdery ceramic materials (TiN, BN, $Al_2O_3$ and WC) with a weight ratio of 1:1, and compression molded under a pressure of 100 kg/cm². The molded article was placed in a heating furnace as shown in FIG. 1, and under a nitrogen atmosphere the furnace temperature was raised at a rate of 15° C./min. In each case, a distinct peak of light emission and heat generation indicating a rapid nitridation of the ultrafine aluminum powder appeared at a furnace temperature ranging from about 600° to 700° C. to provide an aluminum nitride based sintered product.

The exothermic powder (A) mentioned above was mixed with various non-exothermic powdery materials (B) indicated in Table 1. The resultant mixture was compression molded and heated in the furnace at a furnace temperature of 800° C. under a nitrogen atmosphere for 3 hours. Vicker's hardness of the products are shown in Table 1.

TABLE 1

| | Exothermic powder A (size) | Non-exothermic powder B (size) | Mixing ratio of A to B | Main component of sinter | Hardness of sinter | Remarks |
|---|---|---|---|---|---|---|
| | | (800° C., 3 hours, in nitrogen) | | | | |
| 1 | — | AlN | 0:1 | AlN | — | not sintered |
| 2 | 70% Al 30% AlN (0.3 μm) | — | 1:0 | AlN | 143 | sintered |
| 3 | 70% Al 30% AlN (0.3 μm) | TiN (~0.05 μm) | 1:1 | AlN TiN | 117 | sintered |
| 4 | 70% Al 30% AlN (0.3 μm) | BN (5 μm) | 1:1 | AlN BN | — | weakly sintered |
| 5 | 70% Al 30% AlN (0.3 μm) | $Al_2O_3$ (~50 μm) | 1:1 | AlN $Al_2O_3$ | 320 | sintered |
| 6 | 70% Al 30% AlN (0.3 μm) | WC (~0.6 μm) | 1:1 | AlN WC | 123 | sintered |

As illustrated above, the method according to the invention has made it possible to produce not only a sintered product of aluminum nitride but also composite sintered products of aluminum nitride and other various ceramic materials, using a relatively low furnace temperature below 1000° C. Thus, the method according to the invention is commercially very advantageous in that aluminum nitride-based sintered products can be produced by means of a furnace of simpler construction.

We claim:

1. A method for the production of an aluminum nitride-based sintered product, which comprises mixing at least 20% by weight of ultrafine aluminum powder having an average size of not exceeding 0.5 μm with other powdery raw material, compression molding the resultant powdery mixture, placing the molded article in a heating furnace, and heating the article under a nitrogen atmosphere at a furnace temperature ranging from 600° to 800° C., thereby causing the article to generate heat to a temperature of at least 1000° C.

2. The method according to claim 1 wherein the furnace temperature at which the molded article is heated in the furnace is a temperature near the melting point of aluminum.

3. The method according to claim 1 wherein the furnace temperature at which the molded article is heated in the furnace is a temperature which cause the molded article to emit light.

4. The method according to claim 1, wherein the other powdery raw material is fine aluminum nitride.

5. The method according to claim 1, wherein the other powdery raw material is one or more fine materials selected from metals other than aluminum, and metal nitrides, metal oxides and metal carbides.

6. The method according to claim 2 wherein the furnace temperature at which the molded article is heated in the furnace is a temperature which cause the molded article to emit light.

7. The method according to claim 2 wherein the other powdery raw material is fine aluminum nitride.

8. The method according the claim 3 wherein the other powdery raw material is fine aluminum nitride.

9. The method according to claim 2 wherein the other powdery raw material is one or more fine materials selected from metals other than aluminum, and metal nitrides, metal oxides and metal carbides.

10. The method according to claim 3 wherein the other powdery raw material is one or more materials selected from metals other than aluminum, and metal nitrides, metal oxides and metal carbides.

11. The method according to claim 4 wherein the other powdery raw material is one or more materials selected from metals other than aluminum, and metal nitrides, metal oxides and metal carbides.

* * * * *